UNITED STATES PATENT OFFICE.

JOHN STUART CAMPBELL, OF LONDON, ENGLAND.

VULCANIZABLE COMPOSITION OF MATTER AND METHOD OF PREPARING SAME.

1,174,967.   Specification of Letters Patent.   Patented Mar. 14, 1916.

No Drawing.   Application filed April 12, 1915.   Serial No. 20,749.

*To all whom it may concern:*

Be it known that I, JOHN STUART CAMPBELL, a subject of the King of Great Britain and Ireland, residing at 79 Knightrider street, London, E. C., England, have invented a new and useful Vulcanizable Composition of Matter and a Method of Preparing Same, the said composition containing comminuted leather as a base and being suitable for use as a substitute for leather or for producing waterproof or rubber-like sheets or the like, of which the following is a specification.

Many compositions are known which contain comminuted or disintegrated leather as a base together with fibrous material, filling material, oils or fats, and rubber or some other binding agent. Some of these compositions are said to be vulcanizable but in view of the fact that mineral oil, glue, gelatin, or pitch usually forms one of the constituents of these known compositions it is obvious that they could not be vulcanized except by destroying practically all resilience of the product and rendering it quite unsuitable as a substitute for pliable leather.

The essential ingredients of my improved composition are: comminuted or disintegrated leather, animal fats or fatty oils, caustic soda or potash, magnesia (the oxid or carbonate of magnesium), a fibrous material, a filling material, a resilient vulcanizable binder, and a vulcanizing agent; and the essential features of my method or process of preparing the aforesaid composition are that the comminuted or disintegrated leather and the animal fats or fatty oils are boiled together in a steam jacketed pan and kept simmering for about two hours, complete mixture being effected by stirring and caustic soda or potash being added to saponify the fatty matter, the fibrous material being then added and the boiling continued for about half an hour, whereupon the magnesia is added and after further boiling for about three-quarters of an hour the filling material is added, the binding agent in solution being then added and thoroughly mixed with the mass under treatment and the boiling of the whole being continued for about half an hour longer, after which the mass is removed from the pan and dried—for example, in a drying press—and then run through heavy mixing rollers, during which rolling operation the sulfur or the like for vulcanizing is preferably added although it may be introduced in a previous stage of the process. The product is then calendered into sheets of the desired thickness or molded into the desired shape or form and vulcanized, or, if sheets or bands capable of withstanding considerable tension are required, it is softened to render it more or less fluid by means of a suitable solvent and applied to a backing, such as canvas, and afterward vulcanized.

The comminuted leather is preferably obtained by grinding or disintegrating waste or scrap leather; the fats and fatty oils may with advantage be used in combination; the fibrous material may be hair, wool, vegetable fiber or the like; the filling material employed is French chalk or the like and lime; and the resilient vulcanizable binder is an elastic gum or rubber. Tannic acid, a ten per cent. solution of bichromate of potash, and borax may with advantage be added when the fibrous material is introduced into the boiling pan, and any required coloring material may be added with the magnesia. The magnesia has a very valuable property in that it enables the leather to withstand the heat in the vulcanizing stage.

The quantities of the ingredients employed may vary according to the particular purpose for which the product is required, but the following is a suitable formula for general use:

| | |
|---|---|
| Comminuted or disintegrated leather | 500 lbs. |
| Animal fats or fatty oils | 30 to 40 lbs. |
| Caustic alkali, sufficient to saponify the fatty matter. | |
| Fibrous material | Variable. |
| Magnesia | 75 lbs. |
| French chalk | 25 lbs. |
| Lime | 10 lbs. |
| Elastic gum (or rubber) | 75 lbs. |
| Sulfur or other vulcanizing agent in quantity sufficient to obtain the desired degree of hardness. | |

The elastic gum or rubber is dissolved in naphtha or other suitable solvent before being added. If tannic acid, bichromate of potash, and borax be added, suitable quantities for use with the foregoing formula are: 2 lbs. or less of tannic acid, 1 gallon or less of a ten-per-cent. solution of bichromate of potash, and 7 lbs. or less of borax.

What I claim as my invention and desire to secure by Letters Patent is:—

1. A vulcanizable composition of matter consisting of comminuted leather, animal fats or fatty oils, a caustic alkali, magnesia, fibrous material, filling material, a resilient vulcanizable binder, and a vulcanizing agent, substantially as described and for the purpose specified.

2. A vulcanizable composition of matter for use as a substitute for leather and for making rubber-like sheets and bands, consisting of comminuted leather five hundred pounds, animal fats or fatty oils thirty to forty pounds, caustic soda sufficient to saponify the fatty matter, magnesia seventy-five pounds, a variable quantity of fibrous material, French chalk twenty-five pounds, lime ten pounds, dissolved elastic gum seventy-five pounds, and a vulcanizing agent, substantially as described.

3. A method of preparing the herein described composition of matter, consisting in boiling comminuted leather with animal fats or fatty oils, keeping the mixture simmering for about two hours, stirring in a caustic alkali, adding fibrous material and continuing the boiling for about half an hour, then adding magnesia and after further boiling for about three quarters of an hour adding a filling material and a dissolved elastic gum, thoroughly mixing the mass and continuing the boiling for about half an hour longer, after which the mass is removed from the boiler, dried, and then subjected to the action of mixing rollers, during which mixing and rolling operation a vulcanizing agent is added, the product being then formed into sheets and subjected to a vulcanizing operation, all substantially as set forth.

In testimony whereof I have signed my name to this specification in the presence of two subscribing witnesses.

JOHN STUART CAMPBELL.

Witnesses:
A. E. WILLIAMS,
M. POLLON.